Patented Sept. 20, 1938

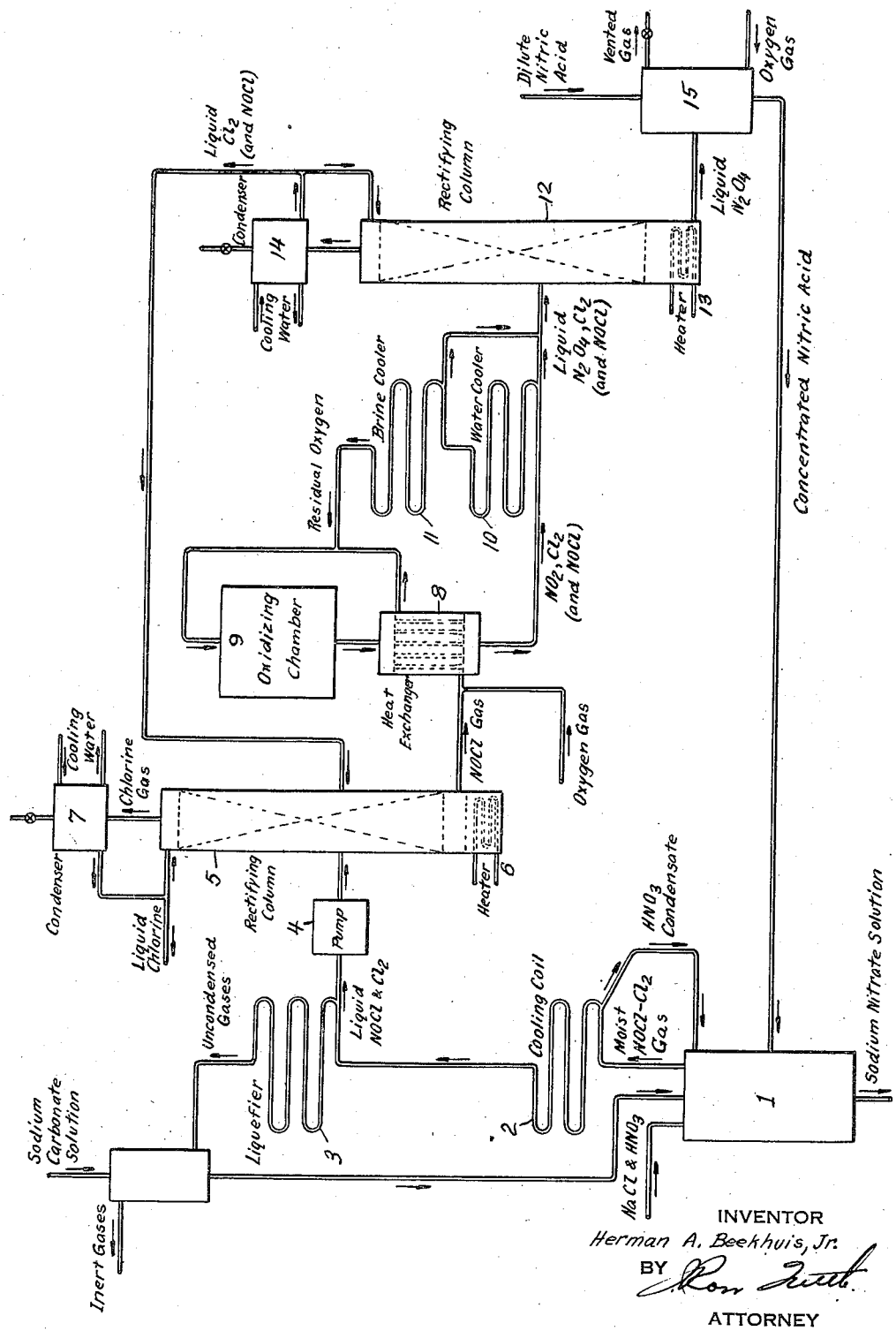

2,130,519

UNITED STATES PATENT OFFICE 2,130,519

PROCESS FOR TREATING MIXTURES OF NITROSYL CHLORIDE AND CHLORINE

Herman A. Beekhuis, Jr., Petersburg, Va., assignor, by mesne assignments, to The Solvay Process Company, New York, N. Y., a corporation of New York Application November 1, 1933, Serial No. 696,138

7 Claims. (Cl. 23—102)

This invention relates to a process for the treatment of mixtures of nitrosyl chloride and chlorine to separately recover valuable products from the mixture. The invention particularly relates to a process for the treatment of the gases containing nitrosyl chloride and chlorine which are formed in the manufacture of a nitrate such as sodium nitrate, potassium nitrate or calcium nitrate by the reaction of nitric acid with sodium chloride, potassium chloride or calcium chloride. In the manufacture of a nitrate by the foregoing reaction of nitric acid with a chloride, the nitric acid may be supplied either as such or may be formed in the presence of the chloride by treating the chloride in an aqueous medium with nitrogen oxides. In either case, a gaseous mixture containing nitrosyl chloride and chlorine may be obtained.

It is an object of this invention to provide a method for the treatment of gases containing nitrosyl chloride and chlorine, particularly the moist gases evolved during the reaction of a chloride and nitric acid, to recover from these gases the nitrosyl chloride and chlorine and to convert the mixture of nitrosyl chloride and chlorine into utilizable products, particularly chlorine and nitrogen peroxide. It is a further object of this invention to provide a process whereby substantially all of the chlorine, both free chlorine and that combined as nitrosyl chloride, may be recovered in a substantially pure condition from mixtures of nitrosyl chloride and chlorine and the nitrogen content of the nitrosyl chloride separately recovered as nitrogen oxides. Further objects of the invention in part will be obvious and in part will appear hereinafter.

In treating a gas containing nitrosyl chloride and chlorine in accordance with this invention, the gas is cooled to a temperature at which the nitrosyl chloride and chlorine are liquefied and the liquid mixture separated from the remaining uncondensed gases. The mixture is then subjected to a rectification treatment to separate the chlorine from the nitrosyl chloride. The nitrosyl chloride is then oxidized to form nitrogen oxides, principally nitrogen peroxide ($NO_2$) and chlorine. The reaction product of this oxidation is cooled to condense as a liquid both the nitrogen oxides and chlorine, and this liquid is then subjected to a rectification treatment to separate the chlorine from the nitrogen oxides. When treating a moist gas containing nitrosyl chloride and chlorine in accordance with this invention, the gas may first be dried and then treated in the manner described above. This drying of the gas may be accomplished by cooling it to condense out the moisture at a temperature above the condensation temperature of nitrosyl chloride and chlorine and in so operating the condensed moisture may act to absorb and remove from the gas nitrogen oxides and/or hydrochloric acid which may be present, without removing from the gas a substantial proportion of the nitrosyl chloride and chlorine, although some relatively small quantities of these gases may be absorbed in or react with the aqueous condensate. Instead of drying the gas by cooling to condense moisture, the gas may be passed in contact with a drying agent which does not react with the nitrosyl chloride and chlorine. The resulting dried gas may then be further cooled to condense out the nitrosyl chloride and chlorine. In the treatment of the liquid mixture of nitrosyl chloride and chlorine to separate the chlorine from this mixture, to oxidize the nitrosyl chloride and to separate the resulting mixture of nitrogen oxides and chlorine, it is preferred to carry out all of this series of steps at a pressure above atmospheric pressure, such as, for example, 8 atmospheres or higher. By thus operating under pressure, the rectification of the nitrosyl chloride and chlorine mixture and the nitrogen oxide and chlorine mixture may be carried out employing a cooling medium at naturally prevailing temperatures to condense gaseous chlorine which is employed as a reflux in the rectification of the mixtures. Again, by employing pressure in the oxidation of the nitrosyl chloride, this step may be operated without requiring a continuous supply of heat from an extraneous source and without the use of a catalyst to catalyze the reaction. The invention further includes improvements in individual steps of the general process above described, particularly in methods for the rectification of mixtures of nitrosyl chloride or nitrogen oxides and chlorine and in the oxidation of nitrosyl chloride to nitrogen oxides and chlorine, which improvements will be more specifically described hereinafter.

For a fuller understanding of the nature and objects of the invention reference should be had to the following detailed description taken in connection with the accompanying drawing in which is illustrated one process for the treatment of nitrosyl chloride and chlorine gases formed by the reaction of sodium chloride and nitric acid to produce sodium nitrate.

In the drawing the numeral 1 indicates a reaction vessel into which sodium chloride and nitric acid are fed and in which these materials react to form a solution of sodium nitrate and a gaseous product containing nitrosyl chloride and chlorine, water vapor and a minor proportion of nitrogen oxides and hydrochloric acid. The gases coming from vessel 1 likewise contain some nitric acid and any inert gases such as air which may be passed into or find their way into vessel 1. The moist gases from vessel 1 are passed through a cooling coil 2 submerged in a cool brine solution. This cooling coil is preferably of glass which is resistant to the action of the highly corrosive materials. In the cooling coil the gases may be cooled to a temperature of about $-10°$ C. to condense out water vapor which forms an aqueous solution of nitric acid with the nitric acide and nitrogen oxides which may be present in the gases from which the water vapor is condensed. Some hydrochloric acid may also be formed by reaction of nitrosyl chloride and chlorine with the water. The relatively small amount of condensate formed, however, in the cooling coil and the fact of its containing a considerable amount of nitric acid, both mitigate against the removal from the cooled gases of any large proportion of their content of chlorine and nitrosyl chloride. The condensate may be returned from cooling coil 2 into vessel 1 where the nitric acid content may be reacted with sodium chloride.

From cooling coil 2 the dried gases are passed through the coils of a liquefier 3 in which the gas is cooled to a temperature of about $-25°$ C. to liquefy both the nitrosyl chloride and the chlorine. The uncondensed inert gases pass out of liquefier 3 and may be washed with a basic solution such as sodium carbonate (soda ash) solution to absorb any residual acidic gases such as nitrogen oxides, nitrosyl chloride or chlorine left in the gas leaving liquefier 3. The solution containing sodium chloride, sodium nitrate, etc., thus obtained, may be introduced into reaction vessel 1. The condensate from liquefier 3, containing both nitrosyl chloride and chlorine, is introduced by means of pump 4 into the mid-portion of a rectifying column 5 operated under a pressure of about 8 atmospheres. If desired, the gases from cooling coil 2 may be compressed to the desired pressure before the nitrosyl chloride and chlorine are liquefied. The compressed gases may then be cooled to liquefy the nitrosyl chloride and chlorine and the liquid mixture separated from the uncondensed inert gases and passed into rectifying column 5. By compressing the gases to a sufficiently high pressure (six to eight atmospheres or above) a moderate cooling suffices to liquefy the nitrosyl chloride and chlorine making it unnecessary to refrigerate the gases to liquefy them. Rectifying column 5 is provided at the bottom with a heater 6 and the top of the column communicates with a condenser 7 by a conduit for passing gas from the column to the condenser and another conduit for returning liquid chlorine from the condenser back to the top of the column. Column 5 may contain a packing, a series of bubble plates, or other devices for insuring intimate contact between a liquid and a gas passed in countercurrent flow with each other in the column. The liquid mixture of nitrosyl chloride and chlorine introduced into column 5 passes downwardly through the bottom portion of the column in contact with an upward flow of nitrosyl chloride vapors. The vapors of nitrosyl chloride serve to heat the liquid mixture and to vaporize from it the chlorine which passes as a gas upwardly through column 5, while the nitrosyl chloride vapors themselves are condensed and flow backwardly to the bottom of the column. By the time the liquid mixture introduced into the column has passed to the bottom of the column, it is substantially free of chlorine so that the liquid collecting in the bottom of column 5 is primarily liquid nitrosyl chloride. This liquid is vaporized by means of heater 6 and a portion of the vapors passed upwardly in column 5 for the treatment of the descending liquid mixture and another portion of the vaporized nitrosyl chloride is withdrawn from the bottom of tower 5. The chlorine gas ascending through tower 5 is contacted with a reflux of liquid chlorine to remove from the gas any vapors of nitrosyl chloride and the resulting purified chlorine gas passes into condenser 7, where it is cooled by means of a cooling medium such as water at normally prevailing atmospheric temperatures. The condensate of liquid chlorine is in part returned to the top of tower 5 for use as the reflux passed in contact with the ascending chlorine gas in this tower and is in part withdrawn as a relatively pure liquid chlorine product.

The nitrosyl chloride withdrawn from the bottom of column 5 is mixed with sufficient oxygen to oxidize the nitrosyl chloride in accordance with the reaction $2NOCl + O_2 = 2NO_2 + Cl_2$. A relatively pure oxygen gas is preferably employed in order to avoid dilution of the nitrosyl chloride with inert gas. The mixture of nitrosyl chloride and oxygen is passed through a heat exchanger 8 and thence to an oxidizing chamber 9 and the oxidation products are passed through heat exchanger 8 in indirect heat exchange with the nitrosyl chloride and oxygen gas on its way to oxidation chamber 9. In heat exchanger 8 the nitrosyl chloride and oxygen gas are heated to a temperature at which the reaction of the nitrosyl chloride and oxygen is initiated, for example, to a temperature of about 200° C. During the passage of the preheated gas through oxidizing chamber 9 the nitrosyl chloride and oxygen react to form nitrogen peroxide and chlorine which reaction may be expressed by the above equation.

Oxidizing chamber 9 is of a sufficient size so that the gases remain in the chamber at least until more than two-thirds and preferably substantially all of the nitrogen oxides formed as a result of the reaction of the nitrosyl chloride are in the state of oxidation corresponding to nitrogen peroxide ($NO_2$).

With the foregoing conditions of operation of heat exchanger 8 and oxidizing chamber 9 and with the gases being maintained under a pressure materially above atmospheric, for example 7 atmospheres or above, the oxidation reaction is self-supporting in so far as the heat requirements are concerned; that is, the heat evolved as a result of the reaction between the nitrosyl chloride and oxygen is sufficient to preheat the incoming gases in heat exchanger 8 to the desired temperature at which the reaction is initiated and the gases in oxidizing chamber 9 attain during their reaction a temperature which is not higher than about 350° to 400° C. and is preferably about 300° C. At these temperatures, substantially all of the nitrogen oxides in the gas leaving heat exchanger 8 for subsequent treatment for the recovery of the nitrogen oxides may be in the form of nitrogen peroxide. While it is preferred to conduct the oxidation of the nitrosyl chloride under a pressure of about 8 atmospheres, this oxidation reaction may be carried out at atmospheric pressure and may be thermally self-sustaining but, under such conditions, a catalyst promoting the reaction to form nitrogen peroxide and chlorine should be introduced into oxidizing chamber 9 and the gases passed over this catalyst. By carrying out the oxidation reaction under the same pressure as is employed in rectifying column 5 treatment of the liquid mixture of nitrosyl chloride and chlorine from liquefier 3 to separate the nitrosyl chloride from the chlorine and to oxidize the former to nitrogen peroxide and chlorine may be carried out under one and the same pressure which simplifies the procedure and is accordingly a preferred mode of operation.

If desired, instead of employing a concentrated oxygen gas for the oxidation of the nitrosyl chloride, a diluted gas such as air may be employed. The advantage in using concentrated oxygen with respect to maintaining the reaction thermally self-supporting decreases as the pressure under which the reaction gases are maintained is increased, and under a sufficiently high pressure the reaction becomes self-sustaining even when the required oxygen is introduced as air.

The gas mixture containing nitrogen peroxide, chlorine and some oxygen and unoxidized nitrosyl chloride is passed first through a water cooler 10 and then through a brine cooler 11 to condense out the nitrogen peroxide, chlorine and nitrosyl chloride, together with such nitrogen oxides other than the nitrogen peroxide which may be present. The oxygen together with residual uncondensed gases (chlorine, nitrogen oxides and nitrosyl chloride) may be returned for admixture with the nitrosyl chloride gas which is to be oxidized, in which case the amount of oxygen gas otherwise mixed with the nitrosyl chloride is adjusted to compensate for the amount of oxygen returned from coolers 10 and 11. When air is employed for the oxidation of the nitrosyl chloride, however, the gases from cooler 11, containing the nitrogen introduced with the oxygen, should be vented from the system instead of being returned to the oxidizing chamber 9.

The liquid nitrogen peroxide and chlorine containing some nitrosyl chloride is introduced into the mid-portion of a rectifying column 12 where the nitrogen peroxide is separated from the chlorine and nitrosyl chloride by a procedure analogous to that by which the nitrosyl chloride and chlorine were separated in rectifying column 5. Thus, the mixture of nitrogen peroxide, chlorine and nitrosyl chloride passes downwardly in rectifying column 12 in contact with vapors of nitrogen peroxide which serve to vaporize the chlorine and nitrosyl chloride from the mixture and are themselves condensed and flow downwardly to the bottom of the column. The liquid collecting in the bottom of column 12 is substantially pure liquid nitrogen peroxide. This liquid is heated by means of a heater 13 to evolve nitrogen peroxide vapors required for treatment of the liquid mixture introduced into the column. The unvaporized liquid nitrogen peroxide is withdrawn from the bottom of the column. In the upper portion of rectifying column 12 the ascending gas is passed in contact with a reflux of liquid chlorine containing some nitrosyl chloride to free the gas of nitrogen peroxide. The chlorine gas containing nitrosyl chloride from the top of the column passes to a condenser 14 where it is cooled by means of cooling water to liquefy the chlorine and nitrosyl chloride. A portion of the liquefied gas is returned to the top of rectifying column 12 to serve as the reflux for the treatment of the ascending gas in this column and the remainder of the liquid chlorine containing nitrosyl chloride may be introduced into the upper portion of rectifying column 5 and employed in this column for the removal of nitrosyl chloride from the chlorine gas ascending through the column with the simultaneous separation of the chlorine from the nitrosyl chloride. The liquid chlorine in its treatment in column 5 is vaporized and passes to condenser 7 where it is again liquefied. By returning the liquid chlorine from condenser 14 to column 5 the nitrosyl chloride in the chlorine is returned and recovered with the nitrosyl chloride in the liquid mixture introduced into column 5. By operating rectifying column 12 with a suitable ratio of nitrogen oxide vapors passed in contact with the incoming liquid mixture in the bottom portion of the column, substantially all of the nitrosyl chloride in the incoming liquid may be vaporized and recovered with the chlorine from condenser 14. While I prefer to substantially free the nitrogen peroxide of nitrosyl chloride in column 12, by employing a lower ratio of nitrogen oxides for scrubbing the liquid in the bottom portion of the column, a portion of the nitrosyl chloride may be left in the liquid nitrogen peroxide withdrawn from the bottom of column 12. If desired rectifying column 12 may be operated by vaporizing sufficient nitrogen peroxide in the bottom of the column that the condensate from condenser 14 contains some nitrogen peroxide. This mode of operation permits of maintaining a minimum content of nitrosyl chloride (and of chlorine also) in the liquid nitrogen peroxide withdrawn from the bottom of column 12. Any nitrogen peroxide thus carried into rectifying column 5 with the liquid from condenser 14, will be recovered with the nitrosyl chloride and cycled from the bottom of column 5 through oxidizing chamber 9 and will be condensed in coolers 10 and 11 and returned to column 12.

Rectifying column 12 may be operated under the same pressure as column 5 and oxidizing chamber 9, but it is preferred to maintain a somewhat lower pressure in column 12, for example, a pressure one or more atmospheres lower than that in column 5 and chamber 9. Since it has been found that the amount of reflux liquid returned from condenser 14 to rectifying column 12 to accomplish a given degree of separation of the nitrogen peroxide from the chlorine and nitrosyl chloride increases rapidly as the pressure of operation of the column is increased, it is preferred to operate column 12 at a pressure of about 4 to 8 atmospheres.

The liquid nitrogen peroxide from column 12 may be introduced into a vessel 15 for reaction with dilute nitric acid and an oxygen gas introduced into this vessel. The concentrated nitric acid thus formed may be withdrawn as a product of the process of this invention. This concentrated nitric acid may, if desired, be introduced into reaction vessel 1 for reaction with sodium chloride to form sodium nitrate. By leaving a proportion of nitrosyl chloride in the liquid nitrogen peroxide withdrawn from rectifying column 12 in the manner indicated above, a nitric acid containing some hydrochloric acid is obtained. Instead of reacting the liquid nitrogen peroxide with dilute nitric acid, water may be introduced into the vessel 15 and employed for the production of nitric acid therein. Any oxygen vented from reaction vessel 15 may, if desired, be employed for the oxidation of the nitrosyl chloride gas in oxidation chamber 9. Instead of employing a concentrated oxygen gas for the conversion of nitrogen peroxide into nitric acid in vessel 15, a dilute gas such as air may be employed but in this case the vented gas is not employed in the oxidation of the nitrosyl chloride.

As indicated above, glass cooling coils should be employed for the first cooling of a moist nitrosyl chloride-chlorine mixture to dry it. The subsequent treatment of the dried mixture may, however, be satisfactorily carried out in apparatus the surfaces of which exposed to contact with the nitrosyl chloride and chlorine are constituted of nickel or of alloys, containing not less than about 30% and preferably a major proportion of nickel. For example, an alloy of nickel and copper containing about 68% to 70% nickel and 32% to 30% copper; an alloy of nickel, molybdenum and iron containing about 60% nickel, 20% molybdenum and 20% iron; and an alloy of nickel, molybdenum, chromium and tungsten containing about 60% nickel, 20% molybdenum, 14% chromium and 6% tungsten, have been found satisfactory materials of construction for the rectification columns, heat exchanger, oxidizing chamber and cooling coils employed for the treatment of the dried gases leaving cooling coil 2 in the process described above. Such alloys are also suitable for surfaces exposed to contact with a moist gas containing nitrosyl chloride and chlorine when the gases are maintained at a temperature above their condensation temperature so as to prevent the formation of an aqueous acid solution in contact with the metal surfaces. Nitrogen peroxide and oxygen may also be present in the gases in contact with the metal surfaces described.

Since certain changes may be made in carrying out the above process without departing from the scope of the invention, it is intended that all matter contained in the above description shall be interpreted as illustrative and not in a limiting sense. As noted, heretofore, the drying of the nitrosyl chloride-chlorine gas may be accomplished by passing it in contact with a drying agent which does not react with either the nitrosyl chloride or the chlorine. Solid $CaCl_2.2H_2O$ may be used for this drying of the gas or the gas may be passed at normal atmospheric temperatures or below in contact with aqueous phosphoric acid solution containing 85% $H_3PO_4$. These drying agents may be regenerated for reuse by heating to evaporate the absorbed water.

I claim:

1. The process for the treatment of a gas containing nitrosyl chloride and chlorine which comprises cooling the gas to condense therefrom a liquid mixture of nitrosyl chloride and chlorine, introducing the liquid mixture into a fractionating column in which the liquid mixture is passed in contact with vapors of nitrosyl chloride to vaporize the chlorine and separate it from the nitrosyl chloride, thus purified nitrosyl chloride is withdrawn from the column, the vaporized chlorine is refluxed with a condensate of liquid chlorine to purify the vapors of nitrosyl chloride and chlorine thus freed from nitrosyl chloride is passed out of the column, mixing with oxygen the nitrosyl chloride separated from admixture with the chlorine, heating the mixture of oxygen and nitrosyl chloride to a temperature at which nitrosyl chloride is oxidized to nitrogen peroxide and chlorine, cooling the reaction products from the oxidation of the nitrosyl chloride to condense therefrom a liquid mixture of nitrogen peroxide and chlorine, introducing this liquid mixture into a second fractionating column in which the liquid mixture is passed in contact with vapors of nitrogen peroxide to vaporize the chlorine and separate it from the nitrogen peroxide, thus purified nitrogen peroxide is withdrawn from the column, the vaporized chlorine is refluxed with a condensate of liquid chlorine to purify the chlorine of nitrogen peroxide, and chlorine thus freed of nitrogen peroxide is passed out of the column.

2. The process for the treatment of a moist gas containing nitrosyl chloride and chlorine which comprises cooling said gases to condense water vapor therefrom, separating the condensate from the uncondensed gases containing nitrosyl chloride and chlorine, further cooling said gases to condense therefrom a liquid mixture of nitrosyl chloride and chlorine, introducing said liquid mixture into a mid-portion of a rectifying column maintained under a pressure of about 8 atmospheres, passing the liquid mixture downwardly in the column in contact with vapors of nitrosyl chloride to vaporize the chlorine and substantially completely free the descending liquid of chlorine, vaporizing the resulting liquid nitrosyl chloride, passing a portion of the resulting vapors of nitrosyl chloride upwardly in the column in contact with the descending liquid mixture, withdrawing another portion of the vapors of nitrosyl chloride from the column, passing the chlorine gas vaporized from the liquid mixture upwardly through said column in contact with a descending flow of liquid chlorine to free the chlorine gas of vapors of nitrosyl chloride, cooling the thus treated chlorine gas to liquefy it, passing a portion of the liquefied chlorine in contact with chlorine gas in said column as the aforesaid descending flow of liquid chlorine, mixing the nitrosyl chloride withdrawn from said column with oxygen, heating the mixture of nitrosyl chloride and oxygen to a temperature of about 200° C., passing the heated mixture through a reaction chamber until about two-thirds or more of the nitrogen oxides formed by reaction of the nitrosyl chloride are in a state of oxidation corresponding to $NO_2$, passing the reaction products in heat exchange with cool nitrosyl chloride and oxygen mixture to heat the mixture to about 200° C., cooling said reaction products to liquefy nitrogen peroxide and chlorine, passing the resulting liquid mixture into the mid-portion of a second rectifying column in which the mixture passes downwardly in contact with vapors of nitrogen peroxide to free it of chlorine and condense the nitrogen peroxide, the liquid nitrogen peroxide substantially free of chlorine is boiled to supply the said vapors of nitrogen peroxide, the chlorine gas is passed upwardly in the column in contact with a descending flow of liquid chlorine to free the gas of nitrogen peroxide, and the chlorine gas substantially free from nitrogen peroxide is cooled to condense liquid chlorine which at least in part is passed downwardly in the column as said descending flow of liquid chlorine, withdrawing from the column liquid nitrogen peroxide, reacting said liquid nitrogen peroxide with water and oxygen to form nitric acid, and conducting the aforesaid oxidation of nitrosyl chloride, liquefaction of nitrogen peroxide and chlorine and rectification of the liquid mixture of nitrogen peroxide and chlorine under substantially the same pressure of about 8 atmospheres as that under which the rectification of the liquid mixture of nitrosyl chloride and chlorine is carried out.

3. The process for the separation of a mixture of liquid nitrogen peroxide and chlorine which comprises introducing said liquid mixture into a mid-portion of a rectifying column, passing the liquid mixture downwardly in the column in contact with vapors of nitrogen peroxide to vaporize the chlorine and substantially to free the mixture of chlorine, leaving a relatively pure liquid nitrogen peroxide, boiling the liquid nitrogen peroxide thus freed from chlorine to vaporize a portion only of the liquid nitrogen peroxide, withdrawing another portion of the liquid nitrogen peroxide, passing the vaporized nitrogen peroxide in contact with the descending flow of liquid mixture, passing the chlorine gas vaporized from the liquid mixture upwardly through said column in contact with a descending stream of liquid chlorine to free the chlorine gas of vapors of nitrogen peroxide, cooling the thus treated chlorine gas to liquefy it at least in part and form the liquid chlorine which is passed downwardly in contact with the chlorine gas passed upwardly through the column, and withdrawing chlorine and nitrogen peroxide thus separated from each other.

4. The process for the treatment of a gas containing nitrosyl chloride and chlorine which comprises cooling the gas to condense therefrom a liquid mixture of nitrosyl chloride and chlorine, fractionally distilling said liquid mixture to separately recover a chlorine distillate and a nitrosyl chloride residue therefrom, oxidizing the nitrosyl chloride to form nitrogen peroxide and chlorine, cooling the gases from the oxidation of the nitrosyl chloride to condense therefrom a liquid mixture of nitrogen peroxide and chlorine, fractionally distilling the liquid mixture of nitrogen peroxide and chlorine to separately recover a liquid chlorine distillate and a nitrogen peroxide residue therefrom, and refluxing the last mentioned chlorine distillate in contact with the vapors evolved in the fractional distillation of said liquid mixture of nitrosyl chloride and chlorine, whereby all of the chlorine product recovered from the original gas containing nitrosyl chloride and chlorine is recovered in the distillate from the fractional distillation of the liquid mixture of nitrosyl chloride and chlorine and all of the nitrogen oxide product is recovered as residue in the fractional distillation of the liquid mixture of nitrogen peroxide and chlorine.

5. In a process for the production of a nitrate, nitrosyl chloride and chlorine by reaction of nitric acid with a chloride in which the gaseous products of the reaction are cooled to condense a liquid mixture of nitrosyl chloride and chlorine, that improvement which comprises passing the uncondensed gases from said cooling in contact with a basic solution to absorb residual acidic gases, and mixing the resulting solution with said nitric acid and chloride.

6. The process for the treatment of a gas containing nitrosyl chloride and chlorine which comprises the steps of (1) cooling the gas to condense therefrom a liquid mixture of nitrosyl chloride and chlorine, (2) fractionally distilling said liquid mixture to separately recover a chlorine distillate and a nitrosyl chloride residue therefrom, (3) oxidizing the nitrosyl chloride to form nitrogen peroxide and chlorine, (4) cooling the gases from the oxidation of the nitrosyl chloride to condense therefrom a liquid mixture of nitrogen peroxide and chlorine, (5) fractionally distilling the liquid mixture of nitrogen peroxide and chlorine to separately recover a liquid chlorine distillate and a nitrogen peroxide residue therefrom, and (6) distilling the last mentioned liquid chlorine distillate in step (2) together with the aforesaid liquid mixture of nitrosyl chloride and chlorine, whereby all of the chlorine product recovered from the original gas containing nitrosyl chloride and chlorine is recovered in the distillate from step (2) and all of the nitrogen oxide product is recovered as residue in the fractional distillation of the liquid mixture of nitrogen peroxide and chlorine in step (5).

7. The process for the treatment of nitrosyl chloride to separately recover nitrogen and chlorine combined therein which comprises mixing the nitrosyl chloride with oxygen gas, heating the mixture to promote the reaction of the oxygen and nitrosyl chloride to form nitrogen peroxide and chlorine, cooling the resulting gas mixture to a temperature at which a liquid condensate containing the nitrogen peroxide and chlorine is formed and separates from residual unreacted oxygen, returning said last mentioned oxygen and mixing it with additional quantities of nitrosyl chloride to be oxidized as aforedescribed, and fractionally distilling the said liquid condensate to separately recover therefrom nitrogen peroxide and chlorine.

HERMAN A. BEEKHUIS, Jr.